United States Patent
Clements et al.

(10) Patent No.: US 12,407,678 B2
(45) Date of Patent: Sep. 2, 2025

(54) SECURITY SCHEMA FOR SECURE DEVICE ONBOARDING

(71) Applicant: Cisco Technology, Inc., San Jose, CA (US)

(72) Inventors: Anish Clements, Pleasanton, CA (US); Sudarshan Masthan Boppana Mani, San Jose, CA (US); Vaishali Sharma, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 281 days.

(21) Appl. No.: 18/330,585

(22) Filed: Jun. 7, 2023

(65) Prior Publication Data
US 2024/0414150 A1    Dec. 12, 2024

(51) Int. Cl.
G06F 7/04 (2006.01)
H04L 9/40 (2022.01)
H04W 12/72 (2021.01)

(52) U.S. Cl.
CPC ........ H04L 63/083 (2013.01); H04L 63/0876 (2013.01); H04W 12/72 (2021.01)

(58) Field of Classification Search
CPC . H04L 63/083; H04L 63/0876; H04L 9/0866; H04L 9/3213; H04W 12/72
See application file for complete search history.

(56) References Cited

U.S. PATENT DOCUMENTS 9,516,018 B1 * 12/2016 Vazquez ................. G06F 21/34
11,006,266 B2    5/2021 Oswal et al.
11,582,601 B2    2/2023 Ganesan et al.
2015/0222621 A1    8/2015 Baum et al.
2019/0089748 A1 *    3/2019 Manor .............. H04W 28/0231
(Continued)

OTHER PUBLICATIONS

Korchenko et al, Methods of Security Authentication and Authorization into Informationals Systems, IEEE, Nov. 27, 2020, pp. 270-274. (Year: 2020).*

(Continued)

*Primary Examiner* — Philip J Chea
*Assistant Examiner* — Jenise E Jackson
(74) *Attorney, Agent, or Firm* — Edell, Shapiro & Finnan, LLC

(57) ABSTRACT

Presented herein are a system and secure device onboarding techniques. A Connectivity Management Platform (CMP) receives a request for an access token that includes a user identifier, a customer organization identifier, and an authorization code from a Device Management Platform (DMP), verifies the authorization code, queries an enterprise server using the user identifier and the customer organization identifier to confirm the user belongs to the customer organization, generates the access token, stores the access token in an authentication datastore, and transmits the access token to DMP. The CMP receives a provisioning request including an eSIM identifier of a device and an access token from the DMP, verifies the access token, obtains a customer organization identifier based thereon, queries an enterprise server using the eSIM identifier and the customer organization identifier to confirm the device belongs to the customer organization, and facilitates secure provisioning of the device with an eSIM profile.

20 Claims, 7 Drawing Sheets

(56) References Cited

U.S. PATENT DOCUMENTS

| | | | |
|---|---|---|---|
| 2019/0268336 A1* | 8/2019 | Gomi | H04W 12/069 |
| 2020/0145409 A1 | 5/2020 | Pochuev et al. | |
| 2021/0112401 A1 | 4/2021 | Chadwick et al. | |
| 2021/0152545 A1 | 5/2021 | Park et al. | |
| 2022/0132303 A1 | 4/2022 | Viswanathan et al. | |
| 2022/0191279 A1 | 6/2022 | Zhang | |
| 2024/0054526 A1* | 2/2024 | Horwitz | H04L 67/50 |

OTHER PUBLICATIONS

Costantino et al, Towards Enforcing On-the-fly Policies in BYOD Environments, IEEE, Dec. 6, 2013, pp. 61-65. (Year: 2013).*
"Secure Authentication and Provisioning of Hardware Devices," Technical Disclosure Commons, Jun. 18, 2020, 6 pages.

* cited by examiner

SECURITY SCHEMA FOR SECURE DEVICE ONBOARDING

TECHNICAL FIELD

The present application relates to a system and techniques involving network equipment and services.

BACKGROUND

Networking architectures have grown increasingly complex in communication environments. In particular, mobile communication networks have grown substantially as end users become increasingly connected to mobile network environments. As the number of mobile users increases, efficient management of communication resources and of users becomes more critical.

DESCRIPTION OF EXAMPLE EMBODIMENTS

Overview

Figure 1:
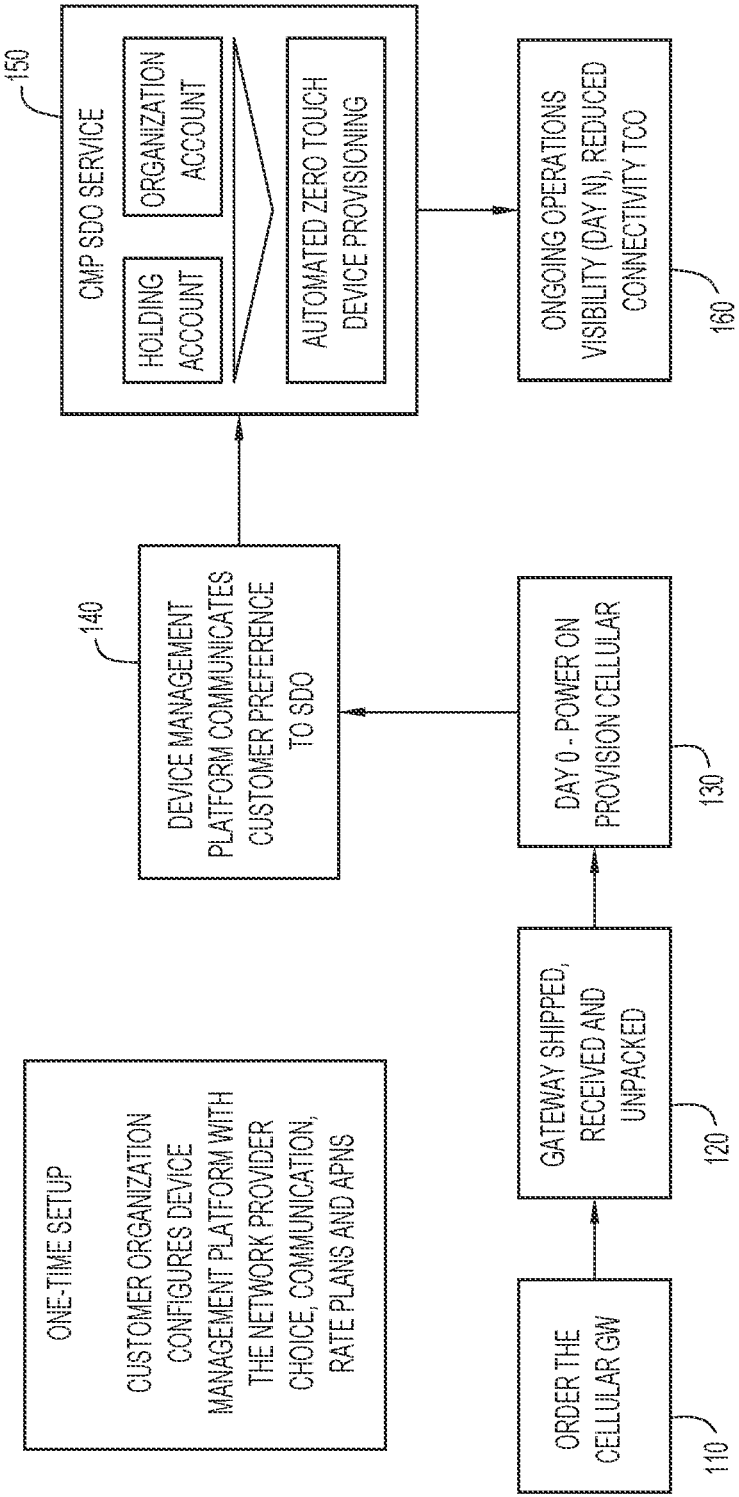
FIG. 1 is a flowchart depicting an example secure device onboarding flow.

Presented herein are techniques to provide a security schema for secure device onboarding that enables trust between wireless devices and enterprises and customers, to ensure that the wireless devices cannot be operationalized by other entities (such as other enterprises, customers, or rogue actors that do not own the devices). The security schema can be implemented for organizations (e.g., companies or other enterprises) to securely configure data with a provisioning entity through intermediate device management platforms. If implemented by a Connectivity Management Platform (CMP) and a Device Management Platform (DMP), the secure device onboarding (SDO) security schema described herein can ensure a secure mechanism for a customer organization to configure network settings of a DMP-provided electronic or embedded Subscriber Identity Module (eSIM) (e.g., of a wireless device) on the CMP.

"Connectivity Management Platform" (CMP) refers to a platform used for deploying and scaling or otherwise managing wireless devices with a managed cellular connectivity service.

"Device Management Platform" (DMP) refers to a software platform used to configure, manage, monitor, and automate a large deployment of wireless devices/networks.

"Customer Organization" (CO) refers to an organization which purchases services of the DMP and the CMP and owns the wireless devices and their eSIMs (e.g., companies or other enterprises).

"Customer" refers to an administrator or other user from the customer organization who uses the DMP.

"Secure Device Onboarding" (SDO) refers to a service used to automate the provisioning process for wireless devices with eSIMs, such as gateways, routers, Internet of Things (IoT) devices, smart phones, and/or any other cellular-capable wireless devices, to establish connectivity to one or more mobile carriers.

Any secrets, keys, or tokens generated by the system and methods described herein may be any secrets/keys or tokens that are generated to be specific to each customer organization. This ensures that the customer (user) that is using the service on the DMP is authenticated, and part of the security chain created for the customer organization. The system and methods described herein help to reduce the risk posed by compromised or mismanaged secrets/keys to avoid exposing multiple devices across multiple organizations. Thus, compromise of one organization's secret key or token does not affect other organizations and their devices, nor compromise the entire DMP.

Example Embodiments

Generally, Secure Device Onboarding provides a mechanism for platforms managed using device management software to onboard a device onto a customer's network carrier account without manual intervention required to configure different network settings, such as Access Point Names (APNs)/Data Network Names (DNNs) and static Internet Protocol (IP) addresses. This enables devices to be onboarded to a network without minimal technical expertise and ensures or reduces the possibility for errors during configuration.

An example Secure Device Onboarding (SDO) flow 100 is shown in FIG. 1 illustrating example details for a one-time setup process whereby a customer organization can configure a Device Management Platform (DMP) with a network provider choice, communication, rate plans, and APNs. The example SDO flow 100 of FIG. 1 may include the following steps: (1) ordering a cellular gateway (step 110); (2) Receiving and unpacking the gateway (step 120); (3) Day 0—powering on and provisioning cellular service (step 130); (4) communicating, by the Device Management Platform, customer preferences to SDO services of a Connectivity Management Platform (step 140); (5) providing, by the SDO services of the Connectivity Management Platform, automated zero touch device provisioning (step 150); and (6) providing ongoing operations visibility (Day N) and reduced connectivity total cost of ownership (step 160).

However, the example SDO flow 100 of FIG. 1 may not be secured across entities such as the customer/user, the customer organization, the Device Management Platform, and the Connectivity Management Platform. Secrets/keys can be used to secure communications and/or interactions among such entities; however, if the secrets/keys are compromised or mismanaged, potential security risks could be exposed for devices across multiple organizations. Further, trust between the enterprise and the device may not be established through the example SDO flow 100 of FIG. 1, which risks the authenticity of the device. If the device is compromised (e.g., using its serial number and its secret key), any other rogue actor may be able to claim the device and its ownership. The system and techniques according to example embodiments described herein address the above issues, among other improvements and enhancements to the SDO process.

Figure 2:
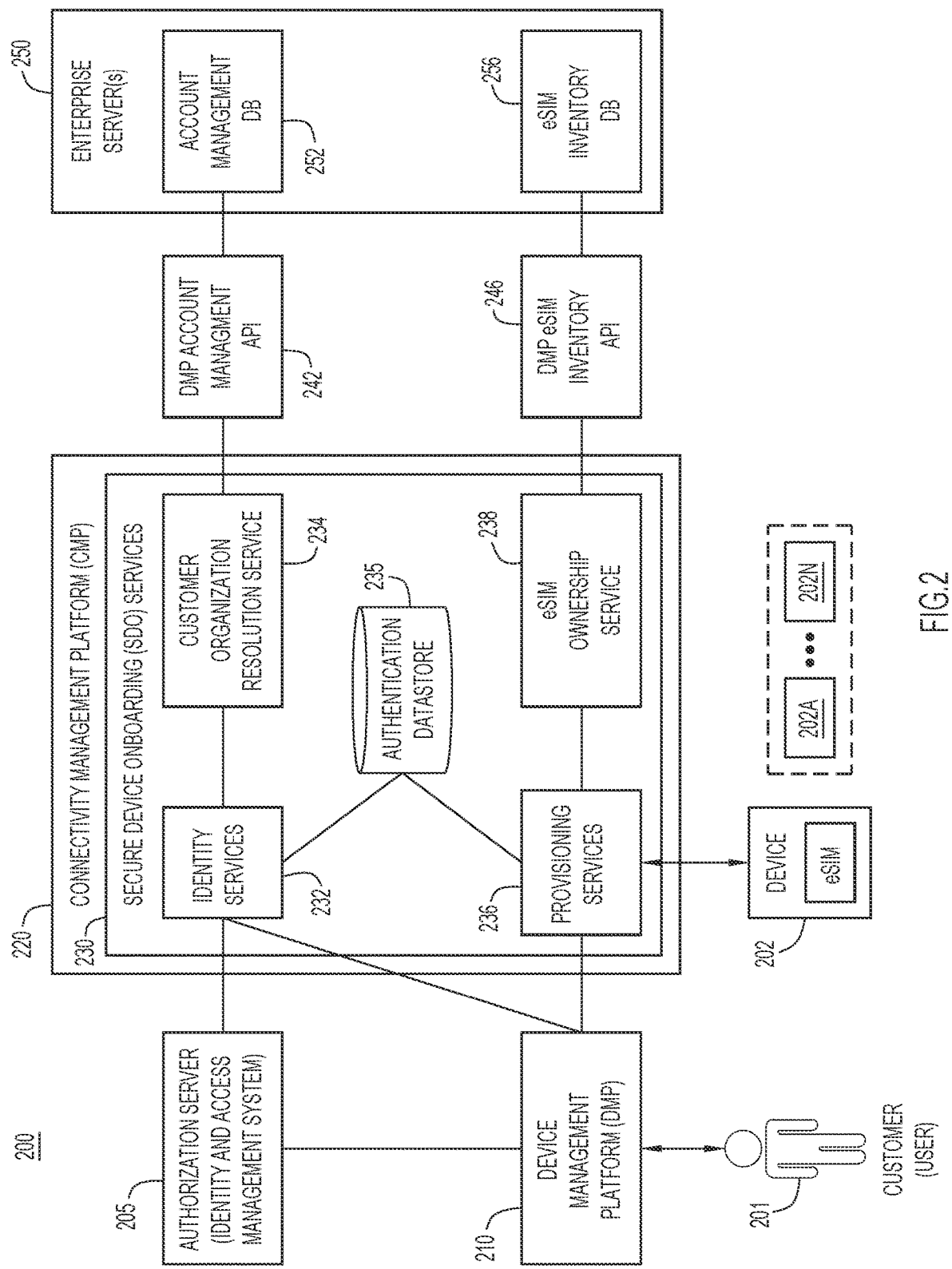
FIG. 2 is a block diagram depicting a system and corresponding communication flows between components of the system, according to an example embodiment.

FIG. 2 is a block diagram depicting a system 200 and corresponding communication flows between components of the system 200, according to an example embodiment. As shown in FIG. 2, system 200 includes an authorization server 205, a Device Management Platform (DMP) 210, a Connectivity Management Platform (CMP) 220, and an enterprise server 250. The CMP 220 provides Secure Device Onboarding (SDO) services 230. Enterprise server 250 may include an Account Management database (DB) 252 and an eSIM Inventory database (DB) 256. Although only one enterprise server 250 is shown in FIG. 2, there may be multiple distinct enterprise servers and/or multiple separate databases dedicated to each respective functionality described herein.

As further described below, the CMP 220 (and/or services provided via the SDO services 230) may include Identity services 232, a Customer Organization Resolution service 234, Provisioning services 236, and an eSIM Ownership service 238. The CMP 220 (and/or the SDO services 230) may also include an Authentication Datastore 235 in communication with the Identity services 232 and the Provisioning services 236 that is configured to store access tokens in connection with identifiers and/or other information relating to authorized users and customer organizations.

FIG. 2 also depicts a user 201 and a wireless device 202, which may be in communication with the provisioning services 236 of CMP of system 200 (e.g., via a radio access network (RAN), not shown in FIG. 2). In FIG. 2, it is assumed that the user 201 is an administrator or the like that may be part of the customer organization that has acquired licenses of the DMP 210 to manage their wireless device 202 (and/or any other wireless devices 202A-202N) and support with Day-0 configuration of the wireless device 202. User 201 may be referred to herein generally as a "customer" that is part of/belongs to the customer organization. Wireless device 202 may be any wireless device that utilizes an eSIM to facilitate cellular connectivity with one or more cellular networks. In various embodiments, wireless device 202 may be a gateway, a router, an Internet of Things (IoT) device, a cellular phone or device, etc., that can be configured (e.g., via an eSIM profile) to connect to a cellular network provider. Services offered in SDO services 230 can be categorized into two categories: (1) identity services, and (2) provisioning services. For case of explanation, some example embodiments described herein involve the customer/user 201 initiating secure device provisioning operations for the wireless device 202 (and/or its corresponding eSIM). However, it should be appreciated that the techniques described herein can be applied, and may be especially beneficial for, securely managing device provisioning operations of a plurality of devices 202A-202N with respective eSIMs (e.g., improvements for simultaneously managing a large population of IoT devices), as shown in FIG. 2.

Generally, an eSIM profile refers to software that is downloaded to an eSIM-enabled device to access a carrier's mobile network. An eSIM profile is a virtual profile that stores a user's subscription and network settings, and may include an Integrated Circuit Card Identifier (ICCID), an International Mobile Subscriber Identity (IMSI) or Subscription Permanent Identifier (SUPI), a Mobile Station Integrated Services Digital Network (MSISDN) number (e.g., phone number), security algorithms, authentication/security keys, etc. for a wireless device/wireless connections, network identifying information, such as one or more Public Land Mobile Network (PLMN) identifiers, APN/DNN information, operating frequencies, etc. and/or any other information that can be defined according to Third Generation Partnership Project (3GPP) and or Global System for Mobile Communications Association (GSMA) standards. The ICCID may be a globally unique serial number that identifies the embedded SIM (IC chip) itself and cannot be changed. The IMSI or SUPI may be a number that uniquely identifies each user of a cellular network (e.g., GSM mobile phone subscriber identifier), and may be changed/updated for the eSIM. While an eSIM only has one ICCID assigned thereto, in some embodiments, an eSIM may have numerous eSIM profiles (e.g., different IMSIs, different MSISDNs, etc.) from different carriers for accessing different mobile networks. However, only one eSIM profile (e.g., one IMSI, one MSISDN, etc.) will be active on a device at any given time. In some embodiments, an eSIM profile may include enterprise specific information, such as a user identifier/user credentials for an enterprise, badge number, department/group/class/tier or other role information (e.g., management, engineering, gold service, bronze service, etc.), and/or the like.

Generally, the DMP 210 can interface with the authorization server 205 and the CMP 220, which may further interface with enterprise server 250 via a DMP Account Management Application Programming Interface (API) 242 and a DMP eSIM Inventory API 246. The CMP 220 may also interface with the authorization server 205. In at least one embodiment, the DMP Account Management API 242 and the DMP eSIM Inventory API 246 may be implemented via the DMP 210, although the APIs are illustrated external to the DMP 210 for FIG. 2 for purposes of brevity only. Thus, DMP 210 may also interface with enterprise server 250.

Broadly during operation of embodiments herein, the Identity services 232 of CMP 220 (one of the SDO services 230) authenticates and authorizes the user 201 (e.g., the consumer of the services) by authenticating an identifier of the customer/user (e.g., a user name or other user ID) using the authorization server 205 (e.g., an Identity and Access Management (IAM) System, such as an OAuth2.0 Authorization Server with Open ID Connect based authentication), and provides an access token (also referred to herein as an "SDO access token") that may be considered an authentication token that can be used for authenticating to the Provisioning services 236 of CMP 220. According to one aspect, the request for the access token may also involve an identifier that uniquely identifies the customer organization (also referred to herein as a customer organization identifier, or "COID") to be sent by the DMP 210 along with the identifier of the user (e.g., user name/ID). The Identity services 232 performs a look-up using a Customer Organization Resolution service 234 of the CMP 220 (of the SDO services 230) to verify that the user 201 actually belongs to the customer organization.

According to one aspect, the Identity services 232 of CMP 220 may comprise an authentication token generator/logic (or secret key generator/logic) that is configured to generate the access token, or SDO access token. More specifically, the SDO access token may be a secret key that is created to be specific to the user associated with the user name/ID, specific to the customer organization that is associated with the COID, or specific to both the user and the customer organization. In some examples, the SDO access token may be a pseudo-randomly generated authentication token for each customer/user and customer organization. In other examples, the SDO access token may be generated based on the identifier for the user (e.g., user name/ID), the identifier for the customer organization (COID), or a combination thereof. In some examples, the SDO access token may be generated based on the user identifier and/or the customer organization identifier using one or more cryptographic transformation techniques (e.g., XOR, encryption, hashing, salting, etc.) to combine the respective identifiers together and create the SDO access token to uniquely identify a respective user/customer organization pair in the CMP 220, while also obfuscating the underlying user identifier and customer organization identifier for enhanced security. Various other known techniques for generating authentication tokens and secret keys are also possible. Additionally, or alternatively, various other data or information may be used to generate an SDO access token for utilization in the techniques described herein.

The Provisioning services 236 of CMP 220 (another one of the SDO services 230) may provide application programming interfaces (APIs) to configure the eSIM of the device 202 (and/or one or more eSIMs of one or more devices 202A-202N) in the network. According to one aspect, the device provisioning request may also involve an identifier that uniquely identifies an eSIM of the device 202 (also referred to herein as an eSIM identifier, or "EID") (and/or eSIM identifiers that uniquely identify respective eSIMs of each of the devices 202A-202N) to be sent by the DMP 210 along with the SDO access token provided by the Identity services 232 of CMP 220. For each eSIM/device transaction, the Provisioning services 236 performs a look-up using an eSIM Ownership service 238 of the CMP 220 (of the SDO services 230) to ensure that the device provisioning request is being invoked against an eSIM/device 202 (and/or one or more eSIMs/devices 202A-202N) that actually belongs to the customer organization.

According to one aspect, the eSIM identifier (or "EID") may be associated with an Internet of Things (IoT) device that includes (i.e., has installed or inserted therein) an eSIM provided by the DMP 210 and is owned by the respective customer organization. In some embodiments, the EID may be the unique identifier for the eSIM (IC chip) itself (e.g., an Integrated Circuit Card Identifier, also referred to as the ICCID of the eSIM), for example. The device provisioning process described herein provides a secure mechanism for the user/customer organization to onboard the IoT device (or other wireless device) to a network, and automatically configure the DMP-provided eSIM of the IoT device with various network settings via device provisioning operations.

As the user 201 (customer) and the customer organization (CO) are managed by the DMP 210, two application programming interfaces (APIs) can be implemented by the DMP 210 to ensure that the SDO services 230 (e.g., Identity services 232 and Provisioning services 236) of the CMP 220 can establish the trust relationships: (1) a DMP Account Management API 242, and (2) a DMP eSIM Inventory API 246.

The DMP Account Management API 242 may be used to establish a trust relationship between the user 201 (customer), the customer organization (CO), the DMP 210, and the CMP 220. The identifier for the user 201, such as a user name as resolved by the IAM system of authorization server 205, and an identifier for the customer organization (COID) can be sent to the DMP Account Management API 242, which responds back with a user status indicating whether the identifier for the user 201 (e.g., user name) belongs to the customer organization corresponding to the COID or not. As further described below with reference to the user authentication process 300 of FIG. 3, the Identity services 232 uses the Customer Organization Resolution service 234 to invoke the DMP Account Management API 242 to query an Account Management database 252 of an enterprise server 250 using the identifier for the user 201 (e.g., user name) and the identifier for the customer organization (COID).

The DMP eSIM Inventory API 246 may be used to establish a trust relationship between the eSIM of the device 202 (and/or one or more eSIMs/devices 202A-202N) and the customer organization (CO). The customer organization identifier (COID) and an eSIM identifier (EID) for the device 202 (and/or the one or more devices 202A-202N) can be sent to the DMP eSIM Inventory API 246, which responds back with an eSIM/device status indicating whether the identifier for the eSIM (EID) of the device 202 (and/or identifiers for eSIMs of the one or more devices 202A-202N) belongs to the customer organization corresponding to the COID or not. As further described below with reference to the device provisioning process 400 of FIG. 4, the Provisioning services 236 uses the eSIM Ownership service 238 to invoke the DMP eSIM Inventory API 246 to query an eSIM Inventory database 256 of an enterprise server 250 using the identifier for the eSIM (EID) and the identifier for the customer organization (COID).

Customer (User) Authentication Flow:

For establishing trust between the user 201 (customer), the customer organization (CO), the DMP 210 and the CMP 220, an authorization server 205 (such as an OAuth2.0 Authorization Server with Open ID Connect based authentication) may be used, for example. The services exposed for SDO services 230 (e.g., Identity services 232 and Provisioning services 236) may be registered as resources with the authorization server 205 associated with the customer organization. In the example of an OAuth2.0 Authorization Server, using Open ID Connect ensures that the user 201 is authenticated using the authorization server 205 on behalf of the customer organization.

In the user authentication process 300 described below with reference to FIG. 3, the DMP 210 invokes the SDO services 230 (e.g., Identity services 232) on behalf of the user 201 and passes along the customer organization identifier (COID) associated with the customer organization. The Identity services 232 uses the Customer Organization Resolution service 234 to query the Account Management database 252 of the enterprise server 250 (via the DMP Account Management API 242) using the COID to verify if the user 201 belongs to the customer organization. As part of establishing trust between the user 201, the customer organization, the DMP 210, and the CMP 220, the user authentication process 300 involves creating a secret key (also referred to herein as an "SDO access token") that will be used for further transactions (e.g., for secure device provisioning as described herein, etc.).

Figure 3:
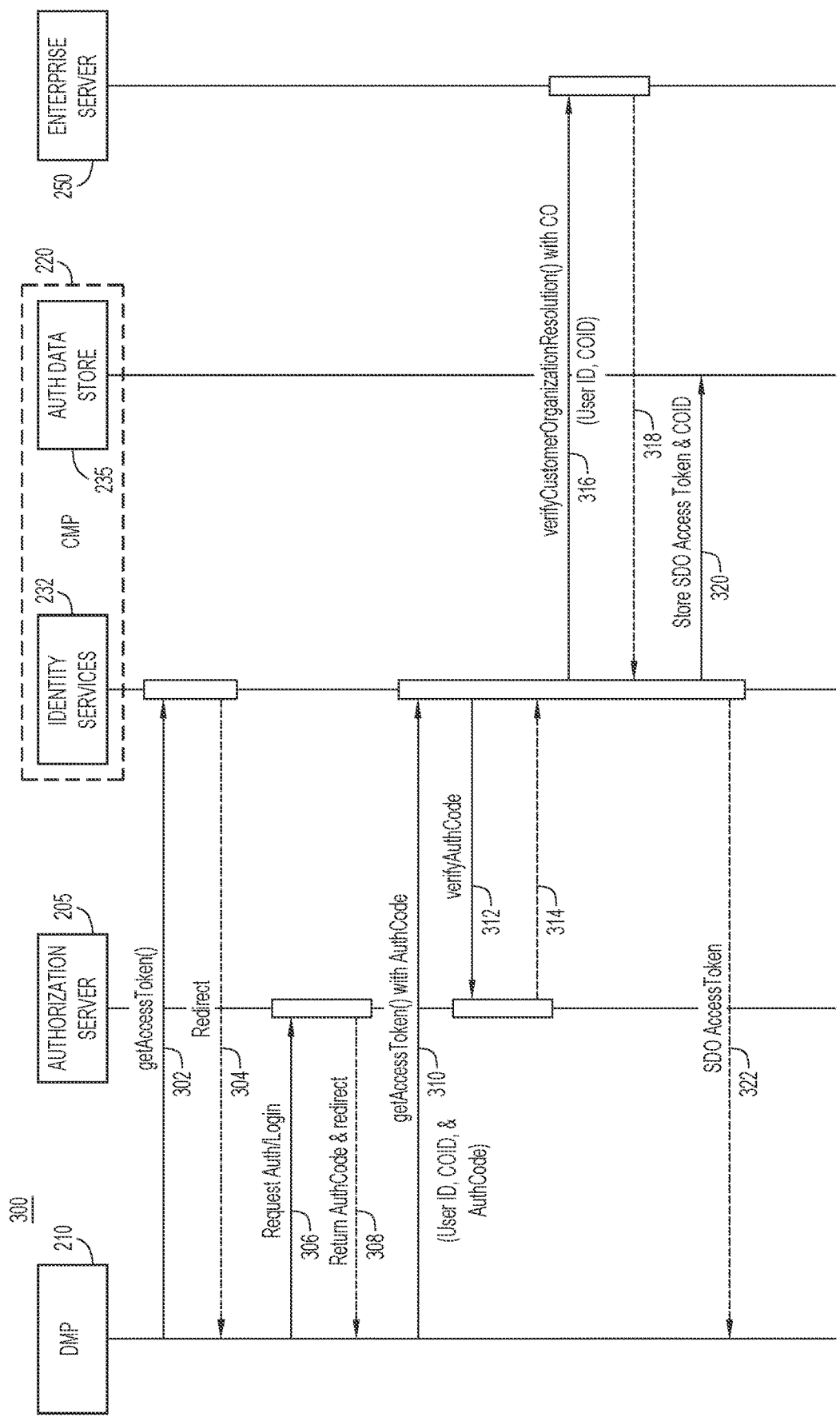
FIG. 3 is a communication flow diagram depicting a user authentication process, according to an example embodiment.

As shown in FIG. 3, the user authentication process 300 begins when DMP 210 transmits a message 302 that indicates an initial request for an SDO access token ("getAccessToken( )") to CMP 220.

Identity services 232 of CMP 220 receives the message 302 indicating the initial request for the SDO access token from the DMP 210 and returns a message 304 indicating a redirect to authorization server 205 back to the DMP 210.

DMP 210 receives the message 304 indicating the redirect to authorization server 205 from CMP 220 (Identity services 232), and transmits a message 306 indicating an authorization request (e.g., an account login request), along with login credentials for the user 201 (e.g., user name, and password or other credentials for a user account) to authorization server 205 for verification.

Authorization server 205 receives the message 306 indicating the authorization request from DMP 210, verifies the credentials of the user 201, and if the credentials are verified, returns a message 308 including an authorization code ("AuthCode") and redirect to CMP 220 (Identity services 232) back to DMP 210. In various embodiments, the authorization code can be any alphanumeric code, string of characters, temporary PIN, etc. that can be utilized to verify authenticity of the user 201 (and/or the DMP 210) by the CMP 220, as discussed in further detail below.

DMP 210 receives the message 308 including the authorization code (AuthCode) and redirect from authorization server 205, and transmits a message 310 indicating a subsequent request for the SDO access token ("getAccessToken( )"), along with the identifier for the user 201 (e.g., user name), an identifier for a customer organization (COID), and the authorization code (AuthCode), to CMP 220.

Identity services 232 of CMP 220 receives the message 310 indicating the subsequent request for the SDO access token with the identifier for the user 201 (e.g., user name), the identifier for the customer organization (COID), and the authorization code (AuthCode) from DMP 210, and transmits a message 312 indicating a request to verify the authorization code ("verifyAuthCode"), along with the identifier for the user 201 (user name) and the authorization code (AuthCode), to authorization server 205.

Authorization server 205 receives the message 312 indicating the verification request from CMP 220 (Identity services 232), verifies the authorization code (AuthCode) associated with the identifier for the user 201 (e.g., user name), and if the authorization code (AuthCode) is verified, returns a message 314 indicating successful verification back to CMP 220.

Identity services 232 of CMP 220 receives the message 314 indicating successful verification of the authorization code (AuthCode) for the user 201 from authorization server 205, and uses the Customer Organization Resolution service 234 of the CMP 220 to transmit a message 316 indicating a query ("verifyCustomerOrganizationResolution( )" with customer organization) along with the user identifier and the CO identifier to the enterprise server 250 (via DMP Account Management API 242) to check if the identifier for the user 201 (e.g., user name) is associated with the identifier for the customer organization (COID) in the Account Management database 252 of the enterprise server 250.

Enterprise server 250 receives the message 316 indicating the query, and including the identifier for the user 201 (e.g., user name) and the identifier for the customer organization (COID), from Identity services 232 (e.g., via Customer Organization Resolution service 234 of CMP 220 and DMP Account Management API 242), checks the identifier for the user 201 (user name) against the Account Management database 252 for the customer organization based on the COID, and returns a message 318 indicating a user status regarding whether the identifier for the user 201 (user name) belongs to the customer organization associated with the COID back to the Identity services 232 (via DMP Account Management API 242 and Customer Organization Resolution service 234 of the CMP 220).

Identity services 232 of CMP 220 receives the message 318 indicating the user status from the enterprise server 250 (via DMP Account Management API 242 and Customer Organization Resolution service 234 of CMP 220), and generates the SDO access token if the user status indicates that the identifier for the user 201 (e.g., user name) belongs to the customer organization associated with the COID. Identity services 232 then transmits a message 320 indicating a request to store the SDO access token in the Authentication Datastore 235 of CMP 220, along with the identifier for the user 201 (user name) and the identifier for the customer organization (COID). Identity services 232 of CMP 220 also transmits a message 322 including the SDO access token to DMP 210 in response to the message 310 indicating the subsequent request for the SDO access token.

At the end of the user authentication process 300 of FIG. 3, DMP 210 receives the message 322 including the SDO access token from CMP 220 (Identity services 232), and locally stores the SDO access token for use in authenticating one or more device transactions (e.g., secure device provisioning, etc.).

As described herein, the SDO access token may be a secret key created by the Identity services 232 to be specific to the user 201 as well as to the respective customer organization (CO), which mitigates risk of a compromised secret key/token affecting other customers, organizations, or the DMP 210 itself.

Thus, the user authentication process 300 of FIG. 3 establishes trust between the user 201 (customer), the customer organization (CO), the DMP 210, and the CMP 220. In some example implementations, the Customer Organization Resolution service 234 of CMP 220 and the DMP Account Management API 242 provided by DMP 210 enable the Identity services 232 of CMP 220 to establish this trust relationship.

Device Provisioning Flow:

For individual eSIM/device transactions, trust also needs to be established between the eSIM of device 202 (and/or eSIMs of devices 202A-202N) and the customer organization (CO). This can be achieved in the device provisioning process 400 described below with reference to FIG. 4, in which the Provisioning services 236 may use the SDO access token to obtain (e.g., retrieve or derive) the identifier for the customer organization (COID) by accessing the Authentication Datastore 235 of the CMP 220 (e.g., to verify the SDO access token and obtain the corresponding COID), and then using the eSIM Ownership service 238 to query the eSIM Inventory database 256 of the enterprise server 250 (via DMP eSIM Inventory API 246) using the COID to verify if the device 202 (and/or the devices 202A-202N) belongs to the customer organization. As part of establishing trust between the eSIM/device 202 and the customer organization, the device provisioning process 400 utilizes the secret key (the SDO access token) that was generated and stored during the user authentication process 300 of FIG. 3.

Figure 4:
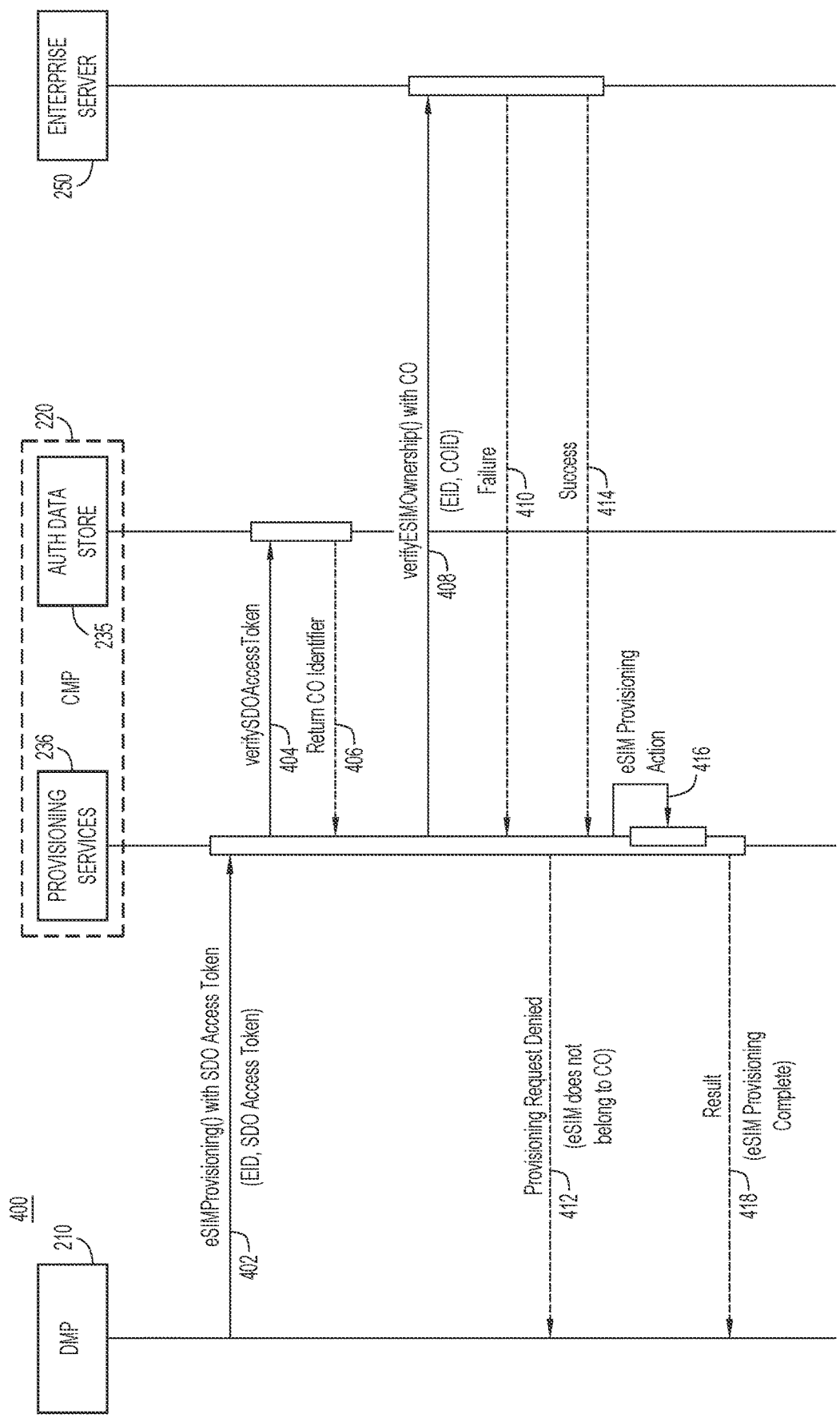
FIG. 4 is a communication flow diagram depicting a device provisioning process, according to an example embodiment.

As shown in FIG. 4, the device provisioning process 400 begins when the DMP 210 sends a message 402 that indicates a device provisioning request ("eSIMProvisioning( )"), along with an identifier for an eSIM (EID) of a device 202 (and/or one or more devices 202A-202N with eSIMs to be securely onboarded to a network) and the SDO access token, to CMP 220.

Provisioning services 236 of CMP 220 receives the message 402 indicating the device provisioning request, and including the identifier for the eSIM (EID) of the device 202 (and/or the devices 202A-202N) and the SDO access token, from the DMP 210, and sends a message 404 indicating a verification request ("verifySDOAccessToken") and including the SDO access token to check the Authentication Datastore 235 of CMP 220 and verify the SDO access token (e.g., by confirming that a matching SDO access token is stored therein). If the Authentication Datastore 235 confirms that there is a match, then Authentication Datastore 235 returns a message 406 including the identifier for the customer organization (COID) that is associated with the SDO access token in the Authentication Datastore 235 back to Provisioning services 236. In another variation, the Provisioning services 236 may be configured to derive the COID directly from the SDO access token itself after it is verified via the Authentication Datastore 235.

Provisioning services 236 receives the message 406 including the identifier for the customer organization (COID) that is associated with the SDO access token from the Authentication Datastore 235, and uses the eSIM Ownership service 238 of the CMP 220 to transmit a message 408 indicating a query ("verifyESIMOwnership( )" with customer organization) along with the eSIM identifier and the CO identifier to the enterprise server 250 (via DMP eSIM Inventory API 246) to check if the identifier for the eSIM (EID) of the device 202 (and/or the one or more devices 202A-202N with eSIMs) is associated with the customer organization corresponding to the COID in the eSIM Inventory database 256 of the enterprise server 250.

Enterprise server 250 receives the message 408 indicating the query, and including the identifier for the eSIM (EID) of the device 202 (and/or the one or more devices 202A-202N with eSIMs) and the identifier for the customer organization (COID), from Provisioning services 236 (e.g., via eSIM Ownership service 238 of CMP 220 and DMP eSIM Inventory API 246), and checks the identifier for the eSIM (EID) of the device 202 (and/or the one or more devices 202A-202N with eSIMs) against the eSIM Inventory database 256 for the customer organization based on the COID. For example, eSIM mapping data stored in the eSIM Inventory database 256 may come from a manufacturing process or an invoicing process where eSIMs are distributed to a customer organization. Thus, a security mechanism is provided whereby each device provisioning call is checked against the enterprise server 250 to ensure that the eSIM does indeed belong to the customer organization of the user from which the call is originating.

If the enterprise server 250 determines that the EID is not associated with the COID in the eSIM Inventory database 256, then the enterprise server 250 returns a message 410 indicating an eSIM/device status (failure) indicating that the device 202 associated with the eSIM identifier (EID) does not belong to the customer organization corresponding to the COID back to the Provisioning services 236 (via DMP eSIM Inventory API 246 and eSIM Ownership service 238). In response to receiving the message 410 indicating the eSIM/device status of "failure" from the enterprise server 250, the Provisioning services 236 of the CMP 220 sends a message 412 back to the DMP 210 indicating that the eSIM Provisioning request is denied, because the eSIM does not belong to the customer organization.

If the enterprise server 250 determines that the EID is associated with the COID in the eSIM Inventory database 256, then the enterprise server 250 returns a message 414 indicating an eSIM/device status (success) indicating that the device 202 associated with the eSIM identifier (EID) belongs to the customer organization corresponding to the COID back to the Provisioning services 236 (via DMP eSIM Inventory API 246 and eSIM Ownership service 238). In response to receiving the message 414 indicating the eSIM/device status of "success" from the enterprise server 250, the Provisioning services 236 of CMP 220 can determine that the eSIM corresponding to the EID, and hence the device 202 itself (and/or the one or more devices 202A-202N with eSIMs), belongs to the customer organization associated with the COID, and then the Provisioning services 236 performs an eSIM provisioning action 416 for configuring an eSIM profile with respect to the device 202. The eSIM provisioning action 416 may facilitate secure provisioning of the eSIM of the device 202 (and/or the one or more devices 202A-202N with respective eSIMs) with an eSIM profile. For example, the eSIM provisioning action 416 may facilitate the downloading of a new eSIM profile onto the eSIM of the device 202 using any techniques now known in the art or hereinafter developed so that the eSIM can connect to a target radio access network.

Once the eSIM provisioning action 416 has been completed (e.g., the eSIM profile has been configured for the eSIM of the device 202), the Provisioning services 236 of the CMP 220 then transmits a message 418 indicating a result of the eSIM provisioning action 416 (e.g., eSIM provisioning complete) back to the DMP 210 in response to the message 402 indicating the device provisioning request. At the end of the device provisioning process 400 of FIG. 4, the DMP 210 receives the message 418 indicating the result of the eSIM provisioning action 416 from the CMP 220 (Provisioning services 236), and can notify the user 201 that the eSIM provisioning request to configure the eSIM profile for the device 202 (and/or the one or more devices 202A-202N with respective eSIMs) has been completed successfully.

Since the SDO access token may be a secret key that is created by the Identity services 232 so as to be specific to the user 201 associated with the user identifier (e.g., user name) and/or to the respective customer organization associated with the COID, the Provisioning services 236 utilizing the SDO access token in connection with the device provisioning process 400 of FIG. 4 to securely onboard one or more devices 202 (e.g., a single IoT device or many IoT devices at the same time) onto a network and automatically configure the eSIM of the device 202 with various network settings mitigates the risk of a compromised secret key affecting devices of other customers or organizations, and prevents unauthorized users and enterprises from onboarding eSIMs/devices that they do not own.

Thus, the device provisioning process 400 of FIG. 4 establishes trust between the eSIM of the device 202 (and/or devices 202A-202N with respective eSIMs) and the customer organization (CO) for each individual eSIM/device transaction. In some example implementations, the eSIM Ownership service 238 of CMP 220 and the DMP eSIM Inventory API 246 provided by the DMP 210 enable the Provisioning services 236 of CMP 220 to establish this trust relationship.

Figure 5:
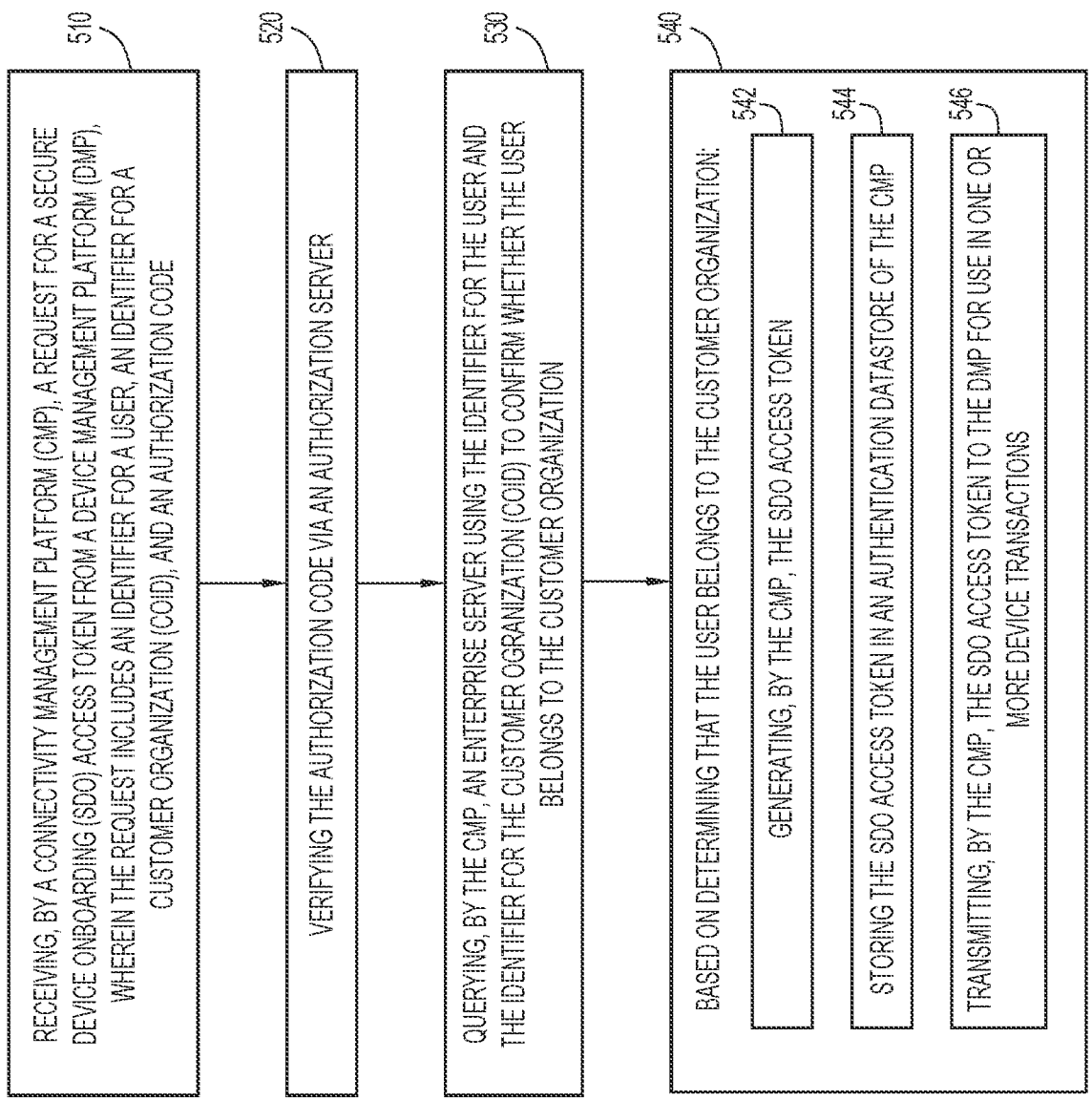
FIG. 5 is a flowchart depicting an example method for implementing a user authentication process, according to an example embodiment.

FIG. 5 is a flowchart depicting an example method 500 for implementing a user authentication process, according to an example embodiment.

At step 510, method 500 includes receiving, by a Connectivity Management Platform (CMP), a request for a secure device onboarding (SDO) access token from a Device Management Platform (DMP), wherein the request includes an identifier for a user, an identifier of a customer organization, and an authorization code.

At step 520, method 500 includes verifying the authorization code via an authorization server.

Upon verifying the authorization code, at step 530, method 500 includes querying, by the CMP, an enterprise server using the identifier for the user and the identifier for the customer organization (COID) to confirm whether the user belongs to the customer organization.

At step 540, method 500 further includes, based on determining that the user belongs to the customer organization: generating, by the CMP, the SDO access token (step 542); storing the SDO access token in an authentication datastore of the CMP (step 544); and transmitting, by the CMP, the SDO access token to the DMP for use in one or more device transactions (step 546).

Figure 6:
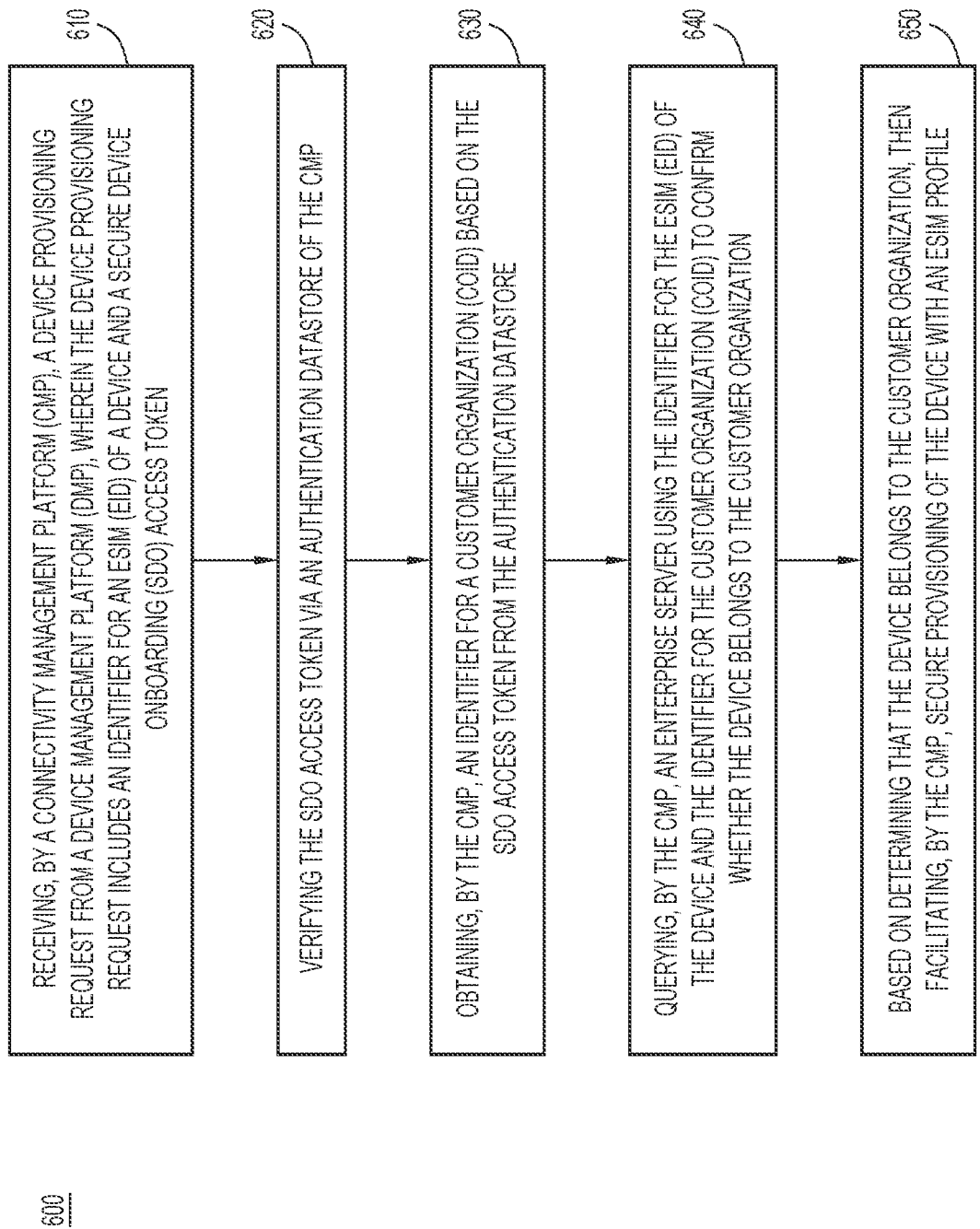
FIG. 6 is a flowchart depicting an example method for implementing a device provisioning process, according to an example embodiment.

FIG. 6 is a flowchart depicting an example method 600 for implementing a device provisioning process, according to an example embodiment.

At step 610, method 600 includes receiving, by a Connectivity Management Platform (CMP), a device provisioning request from a Device Management Platform (DMP), wherein the device provisioning request includes an identifier for an eSIM (EID) of a device and a secure device onboarding (SDO) access token.

At step 620, method 600 includes verifying the SDO access token using an authentication datastore of the CMP.

Upon verifying the SDO access token, at step 630, method 600 includes obtaining, by the CMP, an identifier of a customer organization (COID) based on the SDO access token from the authentication datastore of the CMP.

At step 640, method 600 includes querying, by the CMP, an enterprise server using the identifier for the eSIM (EID) of the device and the identifier for the customer organization (COID) to confirm whether the device belongs to the customer organization.

At step 650, method 600 further includes, based on determining that the device belongs to the customer organization, then facilitating, by the CMP, secure provisioning of the device with an eSIM profile.

The system and methods described above with reference to FIGS. 2-6 provide techniques to establish a security schema between a provider of eSIM management services and Device Management Platforms to provide a secure mechanism for users to onboard their eSIM devices (e.g., wireless devices). According to example embodiments, dual verification can be performed to verify that a user belongs to a particular customer organization (e.g., refer to FIGS. 2, 3, and 5), and further verify that a customer organization is allowed to use a particular eSIM (e.g., refer to FIGS. 2, 4, and 6). The principles of separation of duties and least privilege are used to ensure that compromise of a secret key or token does not affect the security of the devices both horizontally (a compromised key or token does not affect other organizations or customers) and/or vertically (a compromised key or token does not affect the entire DMP).

Figure 7:
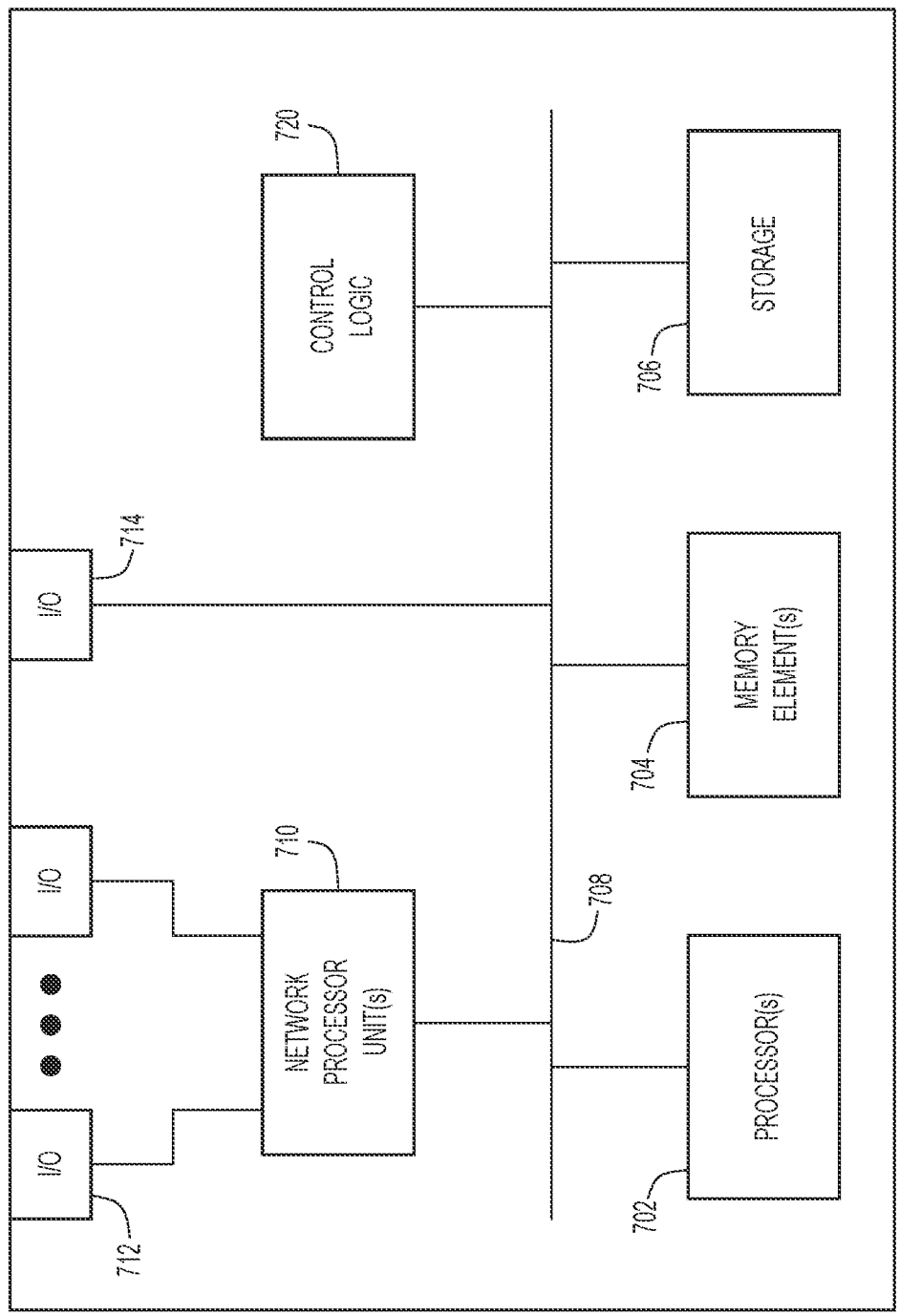
FIG. 7 depicts a hardware block diagram of a computing device that may perform functions associated with operations discussed herein in connection with the techniques depicted in FIGS. 2-6.

Reference is now made to FIG. 7, which depicts a hardware block diagram of a computing device (or other device, e.g., networking device) 700 that may perform functions associated with operations discussed herein in connection with the techniques depicted in FIGS. 2-6. In various embodiments, a computing device or apparatus, such as computing device 700 or any combination of computing devices 700, may be configured as any entity/entities as discussed for the techniques depicted in connection with FIGS. 2-6, in order to perform operations of the various techniques discussed herein.

In at least one embodiment, the computing device 700 may be any apparatus that may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with memory element(s) 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 (wired and/or wireless) to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, any other I/O port(s), and/or antenna(s)/antenna array(s) now known or hereafter developed. Thus, the network processor unit(s) 710 and/or network I/O interface(s) 712 may include suitable interfaces for receiving, transmitting, and/or otherwise communicating data and/or information in a network environment.

I/O interface(s) 714 allow for input and output of data and/or information with other entities that may be connected to computing device 700. For example, I/O interface(s) 714 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory element(s) 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that may include: receiving, by a Connectivity Management Platform (CMP), a request for a secure device onboarding (SDO) access token from a Device Management Platform (DMP), wherein the request includes an identifier for a user, an identifier for a customer organization, and an authorization code; verifying the authorization code via an authorization server; upon verifying the authorization code, querying, by the CMP, an enterprise server using the identifier for the user and the identifier for the customer organization to confirm whether the user belongs to the customer organization; and based on determining that the user belongs to the customer organization: generating, by the CMP, the SDO access token; storing the SDO access token in an authentication datastore of the CMP; and transmitting, by the CMP, the SDO access token to the DMP for use in one or more device transactions.

In some aspects, the techniques described herein relate to a method, further including: prior to receiving the request for the SDO access token that includes the authorization code, receiving by the CMP an initial request for the SDO access token from the DMP that does not include the authorization code; and redirecting the DMP to the authorization server to obtain the authorization code, wherein the authorization code is obtained based on an authorization process involving credentials for the user.

In some aspects, the techniques described herein relate to a method, wherein during the authorization process, the DMP sends the credentials for the user to the authorization server, and the authorization server returns the authorization code to the DMP in response to verifying the credentials for the user.

In some aspects, the techniques described herein relate to a method, wherein verifying the authorization code further includes: transmitting, by the CMP, a request to the authorization server to verify the authorization code that is included in the request for the SDO access token; and receiving, by the CMP, a response from the authorization server indicating whether the authorization code is verified.

In some aspects, the techniques described herein relate to a method, wherein determining that the user belongs to the customer organization includes: receiving, via a customer resolution service of the CMP, a user status from the enterprise server in response to the enterprise server determining that the identifier for the customer organization has the identifier for the user associated therewith in an account management database of the enterprise server.

In some aspects, the techniques described herein relate to a method, wherein generating the SDO access token includes: creating, via an identity service of the CMP, the SDO access token to be specific to the user and to the customer organization.

In some aspects, the techniques described herein relate to a method, further including: receiving, by the CMP, a device provisioning request from the DMP, wherein the device provisioning request includes an identifier for an eSIM of a device and the SDO access token; verifying the SDO access token via the authentication datastore of the CMP; upon verifying the SDO access token, obtaining, by the CMP, the identifier for the customer organization based on the SDO access token from the authentication datastore of the CMP; querying, by the CMP, the enterprise server using the identifier for the eSIM of the device and the identifier for the customer organization to confirm whether the device belongs to the customer organization; and based on determining that the device belongs to the customer organization, facilitating, by the CMP, secure provisioning of the device with an eSIM profile.

In some aspects, the techniques described herein relate to a method, wherein verifying the SDO access token includes: confirming, via a provisioning service of the CMP, that the SDO access token included in the device provisioning request is stored in the authentication datastore of the CMP.

In some aspects, the techniques described herein relate to a method, wherein obtaining the identifier for the customer organization by the CMP includes: retrieving, via the provisioning service of the CMP, the identifier for the customer organization that is associated with the SDO access token in the authentication datastore.

In some aspects, the techniques described herein relate to a method, wherein determining that the device belongs to the customer organization includes: receiving, via an eSIM ownership service of the CMP, a device status from the enterprise server in response to the enterprise server determining that the identifier for the customer organization has the identifier for the eSIM of the device associated therewith in an eSIM inventory database of the enterprise server.

In some aspects, the techniques described herein relate to a method, further including: transmitting, via a provisioning service of the CMP, a message to the DMP indicating that secure provisioning of the device with the eSIM profile has been completed successfully in response to the device provisioning request.

In some aspects, the techniques described herein relate to an apparatus including: one or more memories configured to store computer readable instructions; and one or more processors configured to execute the computer readable instructions to: receive a request for a secure device onboarding (SDO) access token from a Device Management Platform (DMP), wherein the request includes an identifier for a user, an identifier for a customer organization, and an authorization code; verify the authorization code via an authorization server; upon verifying the authorization code, query an enterprise server using the identifier for the user and the identifier for the customer organization to confirm whether the user belongs to the customer organization; and based on determining that the user belongs to the customer organization: generate the SDO access token; store the SDO access token in an authentication datastore; and transmit the SDO access token to the DMP for use in one or more device transactions.

In some aspects, the techniques described herein relate to an apparatus, wherein the one or more processors are configured to execute the computer readable instructions to: receive, via a customer resolution service, a user status from the enterprise server in response to the enterprise server determining that the identifier for the customer organization has the identifier for the user associated therewith in an account management database of the enterprise server.

In some aspects, the techniques described herein relate to an apparatus, wherein the one or more processors are configured to execute the computer readable instructions to: create, via an identity service, the SDO access token to be specific to the user and to the customer organization.

In some aspects, the techniques described herein relate to an apparatus, wherein the one or more processors are further configured to execute the computer readable instructions to: receive a device provisioning request from the DMP, wherein the device provisioning request includes an identifier for an eSIM of a device and the SDO access token; verify the SDO access token via the authentication datastore; upon verifying the SDO access token, obtain the identifier for the customer organization based on the SDO access token from the authentication datastore; query the enterprise server using the identifier for the eSIM of the device and the identifier for the customer organization to confirm whether the device belongs to the customer organization; and based on determining that the device belongs to the customer organization, facilitate secure provisioning of the device with an eSIM profile.

In some aspects, the techniques described herein relate to an apparatus, wherein the one or more processors are configured to execute the computer readable instructions to: confirm, via a provisioning service, that the SDO access token included in the device provisioning request is stored in the authentication datastore.

In some aspects, the techniques described herein relate to an apparatus, wherein the one or more processors are configured to execute the computer readable instructions to: retrieve, via the provisioning service, the identifier for the customer organization that is associated with the SDO access token in the authentication datastore.

In some aspects, the techniques described herein relate to an apparatus, wherein the one or more processors are configured to execute the computer readable instructions to: receive, via an eSIM ownership service, a device status from the enterprise server in response to the enterprise server determining that the identifier for the customer organization has the identifier for the eSIM of the device associated therewith in an eSIM inventory database of the enterprise server.

In some aspects, the techniques described herein relate to one or more non-transitory computer readable storage media storing a program of instructions, which when executed by a processor, configure the processor to perform operations including: receiving a request for a secure device onboarding (SDO) access token from a Device Management Platform (DMP), wherein the request includes an identifier for a user, an identifier for a customer organization, and an authorization code; verifying the authorization code via an authorization server; upon verifying the authorization code, querying an enterprise server using the identifier for the user and the identifier for the customer organization to confirm whether the user belongs to the customer organization; and based on determining that the user belongs to the customer organization: generating the SDO access token; storing the SDO access token in an authentication datastore; and transmitting the SDO access token to the DMP for use in one or more device transactions.

In some aspects, the techniques described herein relate to one or more non-transitory computer readable storage media, wherein the program of instructions when executed by the processor perform further operations including: receiving a device provisioning request from the DMP, wherein the device provisioning request includes an identifier for an eSIM of a device and the SDO access token; verifying the SDO access token via the authentication datastore; upon verifying the SDO access token, obtaining the identifier for the customer organization based on the SDO access token from the authentication datastore; querying the enterprise server using the identifier for the eSIM of the device and the identifier for the customer organization to confirm whether the device belongs to the customer organization; and based on determining that the device belongs to the customer organization, facilitating secure provisioning of the device with an eSIM profile.

In another form, a computer-implemented method is provided that may include: receiving, by a Connectivity Management Platform (CMP), a device provisioning request from a Device Management Platform (DMP), wherein the device provisioning request includes an identifier for an eSIM of a device and a secure device onboarding (SDO) access token; verifying the SDO access token via an authentication datastore of the CMP; upon verifying the SDO access token, obtaining, by the CMP, an identifier for a customer organization based on the SDO access token from the authentication datastore of the CMP; querying, by the CMP, an enterprise server using the identifier for the eSIM of the device and the identifier for the customer organization to confirm whether the device belongs to the customer organization; and based on determining that the device belongs to the customer organization, facilitating, by the CMP, secure provisioning of the device with an eSIM profile.

In some aspects, the techniques described herein relate to a method, wherein verifying the SDO access token includes: confirming, via a provisioning service of the CMP, that the SDO access token included in the device provisioning request is stored in the authentication datastore of the CMP.

In some aspects, the techniques described herein relate to a method, wherein obtaining the identifier for the customer organization by the CMP includes: retrieving, via the provisioning service of the CMP, the identifier of the customer organization that is associated with the SDO access token in the authentication datastore; or deriving, via the provisioning service of the CMP, the identifier of the customer organization based on the SDO access token.

In some aspects, the techniques described herein relate to a method, wherein determining that the device belongs to the customer organization includes: receiving, via an eSIM ownership service of the CMP, a device status from the enterprise server in response to the enterprise server determining that the identifier for the customer organization has the identifier for the eSIM of the device associated therewith in an eSIM inventory database of the enterprise server.

In some aspects, the techniques described herein relate to a method, further including: transmitting, via a provisioning service of the CMP, a message to the DMP indicating that secure provisioning of the device with the eSIM profile has been completed successfully in response to the device provisioning request.

In some aspects, the techniques described herein relate to a method, further including: receiving, by the CMP, a request for the SDO access token from the DMP, wherein the request includes an identifier for a user, the identifier for the customer organization, and an authorization code; verifying the authorization code via an authorization server; upon verifying the authorization code, querying, by the CMP, the enterprise server using the identifier for the user and the identifier for the customer organization to confirm whether the user belongs to the customer organization; and based on determining that the user belongs to the customer organization: generating, by the CMP, the SDO access token; storing the SDO access token in the authentication datastore of the CMP; and transmitting, by the CMP, the SDO access token to the DMP for use in the device provisioning request.

In some aspects, the techniques described herein relate to a method, wherein determining that the user belongs to the customer organization includes: receiving, via a customer resolution service of the CMP, a user status from the enterprise server in response to the enterprise server determining that the identifier for the customer organization has the identifier for the user associated therewith in an account management database of the enterprise server.

In some aspects, the techniques described herein relate to a method, wherein generating the SDO access token includes: creating, via an identity service of the CMP, the SDO access token to be specific to the user and to the customer organization.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   receiving, by a Connectivity Management Platform (CMP), a request for a secure device onboarding (SDO) access token from a Device Management Platform (DMP), wherein the request includes an identifier for a user, an identifier for a customer organization, and an authorization code;
   verifying the authorization code via an authorization server;
   upon verifying the authorization code, querying, by the CMP, an enterprise server using the identifier for the user and the identifier for the customer organization to confirm whether the user belongs to the customer organization; and
   based on determining that the user belongs to the customer organization:
      generating, by the CMP, the SDO access token;
      storing the SDO access token in an authentication datastore of the CMP; and
      transmitting, by the CMP, the SDO access token to the DMP for use in one or more device transactions.

2. The method of claim 1, further comprising:
   prior to receiving the request for the SDO access token that includes the authorization code, receiving by the CMP an initial request for the SDO access token from the DMP that does not include the authorization code; and
   redirecting the DMP to the authorization server to obtain the authorization code, wherein the authorization code is obtained based on an authorization process involving credentials for the user.

3. The method of claim 2, wherein during the authorization process, the DMP sends the credentials for the user to the authorization server, and the authorization server returns the authorization code to the DMP in response to verifying the credentials for the user.

4. The method of claim 2, wherein verifying the authorization code further comprises:
   transmitting, by the CMP, a request to the authorization server to verify the authorization code that is included in the request for the SDO access token; and
   receiving, by the CMP, a response from the authorization server indicating whether the authorization code is verified.

5. The method of claim 1, wherein determining that the user belongs to the customer organization comprises:
   receiving, via a customer resolution service of the CMP, a user status from the enterprise server in response to the enterprise server determining that the identifier for the customer organization has the identifier for the user associated therewith in an account management database of the enterprise server.

6. The method of claim 1, wherein generating the SDO access token comprises:
   creating, via an identity service of the CMP, the SDO access token to be specific to the user and to the customer organization.

7. The method of claim 1, further comprising:
   receiving, by the CMP, a device provisioning request from the DMP, wherein the device provisioning request includes an identifier for an eSIM of a device and the SDO access token;
   verifying the SDO access token via the authentication datastore of the CMP;
   upon verifying the SDO access token, obtaining, by the CMP, the identifier for the customer organization based on the SDO access token from the authentication datastore of the CMP;
   querying, by the CMP, the enterprise server using the identifier for the eSIM of the device and the identifier for the customer organization to confirm whether the device belongs to the customer organization; and
   based on determining that the device belongs to the customer organization, facilitating, by the CMP, secure provisioning of the device with an eSIM profile.

8. The method of claim 7, wherein verifying the SDO access token comprises:
   confirming, via a provisioning service of the CMP, that the SDO access token included in the device provisioning request is stored in the authentication datastore of the CMP.

9. The method of claim 8, wherein obtaining the identifier for the customer organization by the CMP comprises:
   retrieving, via the provisioning service of the CMP, the identifier for the customer organization that is associated with the SDO access token in the authentication datastore.

10. The method of claim 7, wherein determining that the device belongs to the customer organization comprises:
    receiving, via an eSIM ownership service of the CMP, a device status from the enterprise server in response to the enterprise server determining that the identifier for the customer organization has the identifier for the eSIM of the device associated therewith in an eSIM inventory database of the enterprise server.

11. The method of claim 7, further comprising:
    transmitting, via a provisioning service of the CMP, a message to the DMP indicating that secure provisioning of the device with the eSIM profile has been completed successfully in response to the device provisioning request.

12. An apparatus comprising:
    one or more memories configured to store computer readable instructions; and
    one or more processors configured to execute the computer readable instructions to:
       receive a request for a secure device onboarding (SDO) access token from a Device Management Platform (DMP), wherein the request includes an identifier for a user, an identifier for a customer organization, and an authorization code;
verify the authorization code via an authorization server;
upon verifying the authorization code, query an enterprise server using the identifier for the user and the identifier for the customer organization to confirm whether the user belongs to the customer organization; and
based on determining that the user belongs to the customer organization:
generate the SDO access token;
store the SDO access token in an authentication datastore; and
transmit the SDO access token to the DMP for use in one or more device transactions.

13. The apparatus of claim 12, wherein the one or more processors are configured to execute the computer readable instructions to:
receive, via a customer resolution service, a user status from the enterprise server in response to the enterprise server determining that the identifier for the customer organization has the identifier for the user associated therewith in an account management database of the enterprise server.

14. The apparatus of claim 12, wherein the one or more processors are configured to execute the computer readable instructions to:
create, via an identity service, the SDO access token to be specific to the user and to the customer organization.

15. The apparatus of claim 12, wherein the one or more processors are further configured to execute the computer readable instructions to:
receive a device provisioning request from the DMP, wherein the device provisioning request includes an identifier for an eSIM of a device and the SDO access token;
verify the SDO access token via the authentication datastore;
upon verifying the SDO access token, obtain the identifier for the customer organization based on the SDO access token from the authentication datastore;
query the enterprise server using the identifier for the eSIM of the device and the identifier for the customer organization to confirm whether the device belongs to the customer organization; and
based on determining that the device belongs to the customer organization, facilitate secure provisioning of the device with an eSIM profile.

16. The apparatus of claim 15, wherein the one or more processors are configured to execute the computer readable instructions to:
confirm, via a provisioning service, that the SDO access token included in the device provisioning request is stored in the authentication datastore.

17. The apparatus of claim 16, wherein the one or more processors are configured to execute the computer readable instructions to:
retrieve, via the provisioning service, the identifier for the customer organization that is associated with the SDO access token in the authentication datastore.

18. The apparatus of claim 15, wherein the one or more processors are configured to execute the computer readable instructions to:
receive, via an eSIM ownership service, a device status from the enterprise server in response to the enterprise server determining that the identifier for the customer organization has the identifier for the eSIM of the device associated therewith in an eSIM inventory database of the enterprise server.

19. One or more non-transitory computer readable storage media storing a program of instructions, which when executed by a processor, configure the processor to perform operations comprising:
receiving a request for a secure device onboarding (SDO) access token from a Device Management Platform (DMP), wherein the request includes an identifier for a user, an identifier for a customer organization, and an authorization code;
verifying the authorization code via an authorization server;
upon verifying the authorization code, querying an enterprise server using the identifier for the user and the identifier for the customer organization to confirm whether the user belongs to the customer organization; and
based on determining that the user belongs to the customer organization:
generating the SDO access token;
storing the SDO access token in an authentication datastore; and
transmitting the SDO access token to the DMP for use in one or more device transactions.

20. The one or more non-transitory computer readable storage media of claim 19, wherein the program of instructions when executed by the processor perform further operations comprising:
receiving a device provisioning request from the DMP, wherein the device provisioning request includes an identifier for an eSIM of a device and the SDO access token;
verifying the SDO access token via the authentication datastore;
upon verifying the SDO access token, obtaining the identifier for the customer organization based on the SDO access token from the authentication datastore;
querying the enterprise server using the identifier for the eSIM of the device and the identifier for the customer organization to confirm whether the device belongs to the customer organization; and
based on determining that the device belongs to the customer organization, facilitating secure provisioning of the device with an eSIM profile.

\* \* \* \* \*